United States Patent

Yamamoto et al.

[11] Patent Number: 5,919,581
[45] Date of Patent: Jul. 6, 1999

[54] MAGNETIC RECORDING SYSTEM AND MAGNETIC RECORDING MEDIUM USED THEREFOR

[75] Inventors: Tomoo Yamamoto, Hachioji; Nobuyuki Inaba, Hasuda; Masukazu Igarashi, Kawagoe; Masaaki Futamoto, Kanagawa-ken; Yuzuru Hosoe, Hino; Ichiro Tamai, Yokohama; Emi Mangyo, Kokubunji; Kazusuke Yamanaka, Kanagawa-ken, all of Japan

[73] Assignee: Hitachi, Ltd., Tokyo, Japan

[21] Appl. No.: 08/670,121

[22] Filed: Jun. 25, 1996

[30] Foreign Application Priority Data

Jun. 27, 1995 [JP] Japan ................................. 7-160521

[51] Int. Cl.[6] .............................. G11B 5/00; G11B 5/68; G11B 5/706
[52] U.S. Cl. ........................................ 428/694 T; 360/131
[58] Field of Search .................... 428/694 T, 694 B, 428/694 SC, 694 NF, 694 XS, 694 R; 360/110, 113, 128, 131, 132, 133, 135; 365/129, 157, 158, 171

[56] References Cited

U.S. PATENT DOCUMENTS

| | | | |
|---|---|---|---|
| 4,902,583 | 2/1990 | Brucker et al. | 428/665 |
| 4,988,578 | 1/1991 | Yamashita et al. | 428/678 |
| 5,143,794 | 9/1992 | Suzuki et al. | 428/611 |
| 5,370,932 | 12/1994 | Inaba | 428/323 |
| 5,413,868 | 5/1995 | Matsubaguchi et al. | 428/457 |
| 5,478,661 | 12/1995 | Murayama et al. | 428/694 T |
| 5,516,547 | 5/1996 | Shimizu et al. | 427/132 |
| 5,583,727 | 12/1996 | Parkin | 360/113 |
| 5,605,733 | 2/1997 | Ishikawa | 428/65.3 |
| 5,631,094 | 5/1997 | Ranjan et al. | 428/611 |

FOREIGN PATENT DOCUMENTS

| | | |
|---|---|---|
| 0 068 131 | 5/1982 | European Pat. Off. |
| 216062 | 1/1987 | European Pat. Off. |
| 531035 | 3/1993 | European Pat. Off. |
| 538823 | 4/1993 | European Pat. Off. |
| 40 21 970 | 1/1991 | Germany . |
| 5-73880 | 3/1993 | Japan . |
| 5-197944 | 8/1993 | Japan . |

OTHER PUBLICATIONS

Translation of JP 5–197944, 40 p., Aug. 1993.

*Primary Examiner*—John J. Zimmerman
*Assistant Examiner*—Michael LaVilla
*Attorney, Agent, or Firm*—Fay, Sharpe, Beall, Fagan, Minnich & McKee

[57] ABSTRACT

A magnetic recording system high in S/N and low in bit error rate, capable of carrying out writing and reading of high recording density of at least 1 gigabit per 1 square inch and high in reliability can be realized by making the magnetic layer of the magnetic recording medium from a mixture comprising at least one non-magnetic compound selected from the group consisting of oxides and nitrides and a magnetic material comprising Co and Pt as main components and specifying the molar ratio of Pt to Co in the magnetic layer, and employing a magnetoresistive read back magnetic recording head.

16 Claims, 11 Drawing Sheets

MAGNETIC RECORDING SYSTEM AND MAGNETIC RECORDING MEDIUM USED THEREFOR

BACKGROUND OF THE INVENTION

The present invention relates to a magnetic recording system used for an auxiliary recording system of computers and the like and a magnetic recording medium used for the magnetic recording system. More particularly, it relates to a magnetic recording system having a high recording density of 1 gigabit per 1 square inch or more and a magnetic recording medium suitable for realizing the high recording density.

JP-A-5-73880 discloses a magnetic recording medium which comprises a CoCrPt magnetic layer containing silicon oxide, zirconium oxide, tantalum oxide, silicon nitride, boron nitride, titanium nitride or aluminum nitride.

JP-A-5-197944 discloses a magnetic recording medium which comprises a CoNiPtMO magnetic layer or CoCrPtMO magnetic layer (M is at least one element selected from Si, B, Zr, Al, Y, P, Ti, Sn and In).

In the above conventional magnetic recording media, coercivity is increased and medium noise is decreased by adding oxides or nitrides to the magnetic layer of the media.

However, according to the investigation by the inventors, the above conventional magnetic recording media suffer from the problems that decrease of medium noise in the high linear recording density area of higher than 150 kFCI (Flux Change per Inch) is insufficient and it is difficult to realize a high recording density of at least 1 gigabit per square inch.

SUMMARY OF THE INVENTION

Accordingly, the object of the present invention is to solve the above technical problems and to provide a magnetic recording system which makes it possible to attain a high recording density of at least 1 gigabit per 1 square inch, and a magnetic recording medium suitable for realizing the high recording density.

In the first aspect, the present invention provides a magnetic recording system having a magnetic recording medium and a magnetic recording head which carries out writing in and reading back from the magnetic recording medium, said magnetic recording medium comprising a substrate and a magnetic layer formed on the substrate directly or indirectly with an underlayer intervening between the magnetic layer and the substrate, characterized in that the magnetic layer of the magnetic recording medium comprises a mixture of at least one non-magnetic compound selected from the group consisting of oxides represented by the formula $MO_x$ (wherein M represents at least one element selected from Si, Al, Ta, Y and Ti, and x represents a numerical value of from about 1 to about 2.5) and a magnetic material of an alloy comprising Co and Pt as main components, the molar ratio of Pt to Co in the magnetic layer is 0.6–1.2 and the molar ratio of the non-magnetic compound to Co is 0.1–2.8, and the magnetic recording head includes a magnetoresistive read back magnetic recording head.

In the second aspect, the present invention provides the magnetic recording system having the above construction, characterized in that the magneto-resistive read back magnetic recording head has two shield layers and a magnetoresistive sensor formed between the shield layers and the distance between the two shield layers is 0.35 µm or less.

In the third aspect, the present invention provides the magnetic recording system having the above construction, characterized in that the product (Br•t) of a residual magnetic flux density, Br, measured by applying a magnetic field in the relative running direction of the magnetic recording head in respect to the magnetic recording medium at the time of recording and a thickness, t, of the magnetic layer of the magnetic recording medium is 10–100 gauss•micron.

In the fourth aspect, the present invention provides the magnetic recording system having the above construction, characterized in that the coercivity of the magnetic recording medium measured by applying a magnetic field in the relative running direction of the magnetic recording head in respect to the magnetic recording medium at the time of recording is 2.4 kOe or more.

In the fifth aspect, the present invention provides the magnetic recording system having the above construction, characterized in that the magnetoresistive read back magnetic recording head has a magnetoresistive sensor which includes a plurality of magnetic layers and non-magnetic layers provided between the magnetic layers, said magnetic layers causing a great change in resistivity due to a relative change of mutual magnetization directions by an external magnetic field.

In the sixth aspect, the present invention provides the above-mentioned magnetic recording system of the first aspect, characterized in that the non-magnetic compound in the magnetic layer of the magnetic recording medium is not an oxide, but a nitride represented by the formula $LN_y$ (wherein L represents at least one element selected from Si, B and Al and y represents a numerical value of from about 1 to about 1.3).

The inventions of the second to fifth aspects can also be applied to the invention of the sixth aspect.

It is further preferred in the invention of the first or sixth aspect that the molar ratio of the non-magnetic compound to Co in the magnetic layer of the magnetic recording medium is 0.5–2.4.

In the seventh aspect, the present invention provides a magnetic recording medium comprising a substrate and a magnetic layer formed on the substrate directly or indirectly with an underlayer intervening between the magnetic layer and the substrate, characterized in that the magnetic layer of the magnetic recording medium comprises a mixture of at least one non-magnetic compound selected from the group consisting of oxides represented by the formula $MO_x$ (wherein M represents at least one element selected from Si, Al, Ta, Y and Ti, and x represents a numerical value of from about 1 to about 2.5) and a magnetic material of an alloy comprising Co and Pt as main components, the molar ratio of Pt to Co in the magnetic layer is 0.6–1.2 and the molar ratio of the non-magnetic compound to Co is 0.1–2.8.

In the eighth aspect, the present invention provides the magnetic recording medium of the seventh aspect, characterized in that the non-magnetic compound in the magnetic layer of the magnetic recording medium is not an oxide, but a nitride represented by the formula $LN_y$ (wherein L represents at least one element selected from Si, B and Al and y represents a numerical value of from about 1 to about 1.3).

It is further preferred in the invention of the seventh or eighth aspect that the molar ratio of the non-magnetic compound to Co in the magnetic layer of the magnetic recording medium is 0.5–2.4.

The inventors have prepared various magnetic recording media by changing the composition of the magnetic layer to search for the composition of the magnetic layer which is optimum when the medium is combined with a magnetic recording head. Furthermore, they have changed the magnetic recording heads to search for magnetic recording heads having the structure which is optimum when the magnetic recording head is combined with the magnetic recording medium. As a result, the magnetic recording systems and magnetic recording media of the present invention have been accomplished.

In the magnetic recording system of the first aspect, the magnetic layer of the magnetic recording medium is composed of a mixture of at least one non-magnetic compound selected from the group consisting of oxides and nitrides and a magnetic material of an alloy comprising Co and Pt as main components, the molar ratio of Pt to Co in the magnetic layer is limited to 0.6–1.2, and, furthermore, a magnetoresistive read back recording head is employed.

When Co and Pt are used as the main components of the magnetic material and the molar ratio of them is limited and the magnetic recording medium is combined with a magnetoresistive head, the medium S/N can be increased to about 2.0 or more. The medium S/N is a ratio of output to medium noise (a value obtained by excluding the noise of system from the total noise). Thus, the medium noise in a high linear recording density area of at least 150 kFCI can be sufficiently reduced, a high recording density of at least 1 gigabit per 1 square inch can be realized, and a magnetic recording system of high reliability with low bit error rate can be obtained.

When Cr or Ni are added to the CoPt magnetic material, coercivity and coercivity squareness decrease in the area of high concentration of the non-magnetic compound and this is not preferred.

Cr, Ni, etc. have the property of readily segregating at the crystal grain boundary of the Co alloy. In a Co alloy thin film magnetic recording medium containing no non-magnetic compound, the segregation of Cr or Ni at the grain boundary has the effect to lower the exchange interaction between the crystal grains and enhance the coercivity. However, in the case of a magnetic recording medium containing the non-magnetic compound at a high concentration, since the exchange interaction between crystal grains is already lowered by the non-magnetic compound, there is no effect to enhance the coercivity due to the lowering of the exchange interaction caused by the addition of Cr, Ni and the like, and, furthermore, the elements such as Cr and Ni reduce crystal magnetic anisotropy of the CoPt alloy. Therefore, the alloy may consist essentially of Co and Pt.

In the magnetic recording system of the second aspect, when the magnetoresistive head has two shield layers and a magnetoresistive sensor formed between the shield layers, the distance between the two shield layers is limited to 0.35 μm or less.

This construction results in about 15% or less of jitter and discrimination of bits can be satisfactorily made.

In the magnetic recording system of the third aspect, the product of residual magnetic flux density, Br, measured by applying a magnetic field in the relative running direction of the magnetic recording head in respect to the magnetic recording medium at the time of recording and thickness, t, of the magnetic layer of the magnetic recording medium (namely, Br•t) is limited to 10–100 gauss•micron.

This results in about 15% or less of jitter and discrimination of bits can be satisfactorily made.

In the magnetic recording system of the fourth aspect, the coercivity of the magnetic recording medium measured by applying a magnetic field in the relative running direction of the magnetic recording head in respect to the magnetic recording medium at the time of recording is limited to 2.4 kOe or more.

When the coercivity is 2.4 kOe or more, system S/N is higher than 1 and the noise can be made smaller than the signal. The system S/N is a ratio of the output to the noise of the system.

In the magnetic recording system of the fifth aspect, as a magnetoresistive head, there is employed a structure having a magnetoresistive sensor including a plurality of magnetic layers and non-magnetic layers provided between the magnetic layers, said magnetic layers bringing about a great change in resistivity due to relative change of mutual magnetization directions caused by an external magnetic field.

According to this construction, signal intensity can be further enhanced by the giant magnetoresistive effect, and a magnetic recording system of high reliability with a recording density of at least 3 gigabits per 1 square inch can be realized.

The reason for using an alloy comprising Co and Pt as the main components in a magnetic material of the magnetic layer of the magnetic recording medium is as follows. Hitherto, a (Co+Pt+α) (ternary) alloy has been used as the magnetic material. However, when an alloy comprising (Co+Pt) as the main components is used while limiting the compositional ratio thereof and this magnetic material is combined with a magnetoresistive head, the medium S/N can be made to about 2.0 or higher. Thus, the medium noise in the high linear recording density area of 150 kFCI or higher can be sufficiently reduced and a high recording density of 1 gigabit or higher per 1 square inch can be realized.

Elements such as Ar which are inevitably taken in during film-forming by sputtering or the like may be contained in a slight amount in the magnetic material.

The reasons for employing an oxide represented by the formula MOx (wherein M represents at least one element selected from Si, Al, Ta, Y and Ti, and x represents a numerical value of from about 1 to about 2.5) as the non-magnetic compound in the magnetic layer of the magnetic recording medium and limiting the molar ratio of the non-magnetic compound to Co in the magnetic layer to 0.1–2.8 are as follows. When the molar ratio of the oxide to Co is 0.1 or more, normalized noise can be reduced to 0.025 or less. The normalized noise is a value obtained by normalizing with a signal output of 10 kFCI the medium noise when a signal is recorded at a recording density of 150 kFCI. Furthermore, the coercivity can be increased to 2.4 kOe or more. When the molar ratio of the oxide to Co is 2.8 or less, a sufficient output can be obtained.

According to the sixth aspect of the present invention, in the magnetic recording system of the first aspect, a nitride represented by the formula LNy (wherein L represents at least one element selected from Si, B and Al and y represents a numerical value of from about 1 to about 1.3) is employed in place of the oxide as the non-magnetic compound in the magnetic layer of the magnetic recording medium.

When the molar ratio of the nitride to Co is 0.1 or more, normalized noise can be reduced to 0.025 or less. Moreover, the coercivity can be increased to 2.4 kOe or more. When the molar ratio of the nitride to Co is 2.8 or less, a sufficient output can be obtained.

The reason for limiting the molar ratio of the non-magnetic compound to Co in the magnetic layer of the magnetic recording medium to 0.5–2.4 is that when the molar ratio of the non-magnetic compound to Co is limited to the range of 0.5–2.4, the normalized noise can be reduced to 0.016 or less, and, moreover, the coercivity can be increased to 2.4 kOe or more.

In the magnetic recording medium of the seventh aspect, the magnetic layer is composed of a mixture of at least one non-magnetic compound selected from the group consisting of oxides represented by the formula MOx (wherein M represents at least one element selected from Si, Al, Ta, Y and Ti, and x represents a numerical value of from about 1 to about 2.5) and an alloy magnetic material comprising Co and Pt as main components, the molar ratio of Pt to Co in the magnetic layer is limited to 0.6–1.2 and the molar ratio of the non-magnetic compound to Co is limited to 0.1–2.8.

When Co and Pt are used as the main components of the magnetic material and the molar ratio of them is limited, the medium S/N can be increased to about 2 or more. Thus, the medium noise in a high linear recording density area of at least 150 kFCI can be sufficiently reduced and a high recording density of at least 1 gigabit per 1 square inch can be realized.

The reason for using an alloy comprising Co and Pt as main components as a magnetic material of the magnetic layer is as follows. Hitherto, a (Co+Pt+α) (ternary) alloy has been used as the magnetic material. However, when the alloy comprising (Co+Pt) as main components is used while limiting the compositional ratio thereof, the medium S/N can be made to be about 2.0 or more. Thus, the medium noise in the high linear recording density area of 150 kFCI or more can be sufficiently reduced and a high recording density of 1 gigabit or more per 1 square inch can be realized.

The reasons for employing an oxide represented by the formula MOx (wherein M represents at least one element selected from Si, Al, Ta, Y and Ti, and x represents a numerical value of from about 1 to about 2.5) as the non-magnetic compound in the magnetic layer and limiting the molar ratio of the non-magnetic compound to Co in the magnetic layer to 0.1–2.8 are as follows. When the molar ratio of the oxide to Co is 0.1 or more, normalized noise can be reduced to 0.025 or less. Moreover, coercivity can be increased to 2.4 kOe or more. When the molar ratio of the oxide to Co is 2.8 or less, a sufficient output can be obtained.

According to the eighth aspect of the present invention, in the magnetic recording medium of the seventh aspect, a nitride represented by the formula LNy (wherein L represents at least one element selected from Si, B and Al and y represents a numerical value of from about 1 to about 1.3) is used in place of the oxide as the non-magnetic compound in the magnetic layer.

When the molar ratio of the nitride to Co is 0.1 or more, normalized noise can be reduced to 0.025 or less. Moreover, coercivity can be increased to 2.4 kOe or more. When the molar ratio of the nitride to Co is 2.8 or less, a sufficient output can be obtained.

The reason for limiting the molar ratio of the non-magnetic compound to Co in the magnetic layer to 0.5–2.4 in the invention of the seventh or eighth aspect is that when the molar ratio of the non-magnetic compound to Co is limited to the range of 0.5–2.4, the normalized noise can be reduced to 0.016 or less and, moreover, coercivity can be increased to 2.4 kOe or more.

DETAILED DESCRIPTION OF THE PREFERRED EMBODIMENT

The present invention will be explained in detail by the following examples. These examples do not limit the invention in any manner.

EXAMPLE 1

Figure 1A:
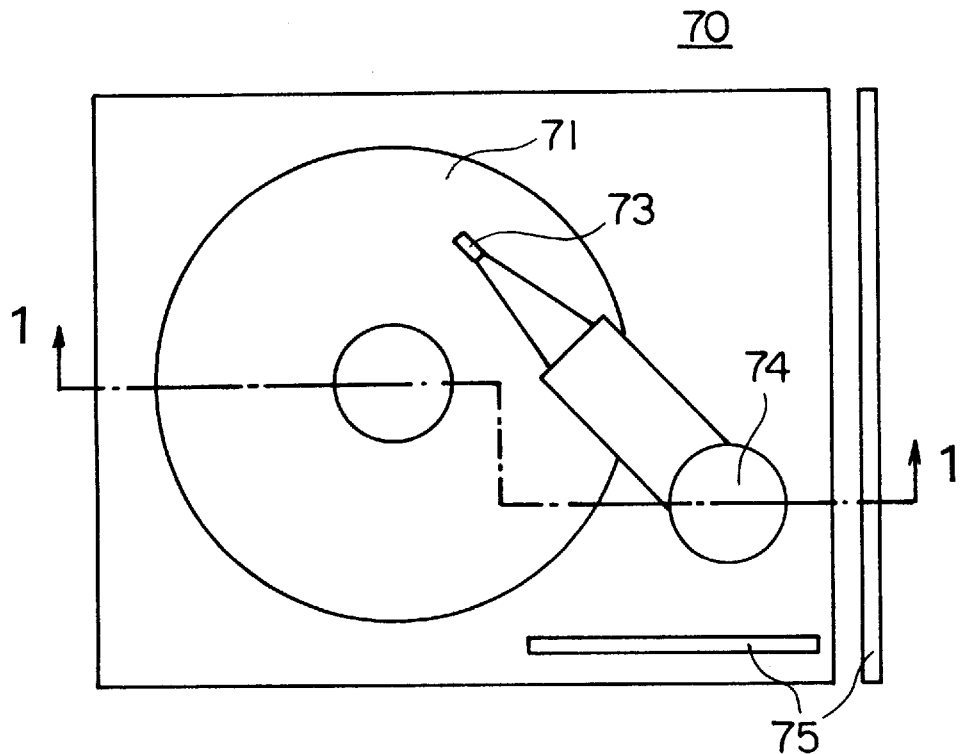
FIG. 1(a) is a schematic plan view of the magnetic recording system of Example 1.
Figure 1B:
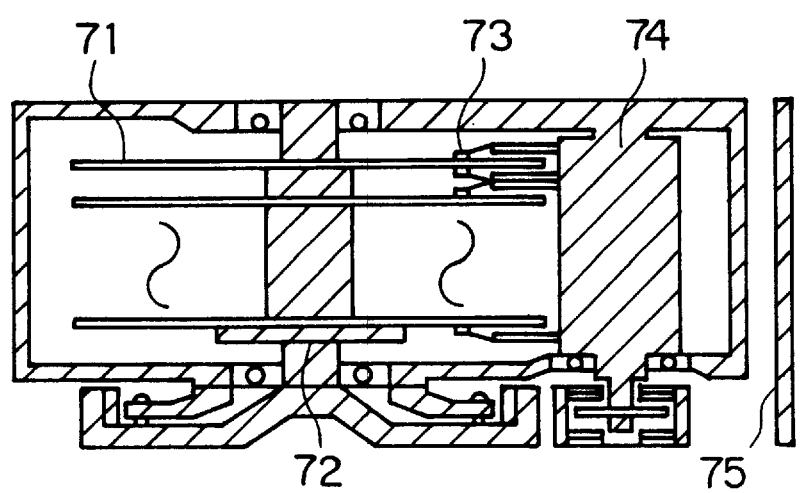
FIG. 1(b) is schematic sectional view of the magnetic recording system shown in FIG. 1(a) taken along line 1—1.

FIGS. 1(a) and (b) are a schematic plan view and a schematic sectional view of a magnetic recording system 70 of Example 1.

The magnetic recording system 70 has a magnetic recording medium 71, magnetic recording medium driving unit 72 which rotates the magnetic recording medium 71 in the recording direction, magnetic recording head 73 which carries out writing in and reading back from the magnetic recording medium 71, magnetic recording head driving unit 74 which drives the magnetic head 73 relatively to the magnetic recording medium 71, and read/write signal processing part 75 which carries out processing of the write signal or read signal.

Figure 2:
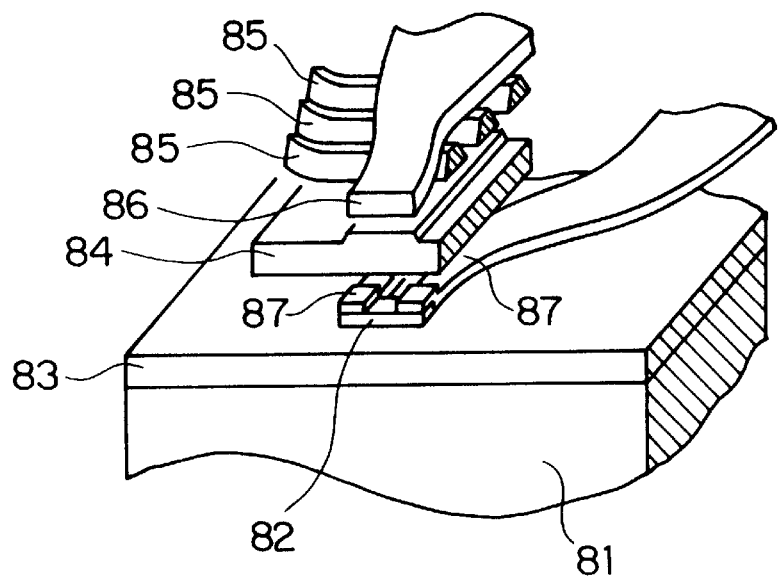
FIG. 2 is an oblique view which shows the structure of magnetic recording head in the magnetic recording system of Example 1.

FIG. 2 shows the structure of the magnetic recording head 73.

The magnetic recording head 73 is a dual head with an inductive head for writing and a magnetoresistive (MR) read back recording head. That is, the portion comprising upper recording magnetic pole 86 and shield layer-recording magnetic pole 84 which hold coil 85 therebetween acts as a magnetic recording head for writing. The portion comprising the shield layer-recording magnetic pole 84 and lower shield layer 83 between which magnetoresistive sensor 82 and electrode pattern 87 are held acts as a magnetic recording head for read back. The output signal from the magnetoresistive sensor 82 is taken out through the electrode pattern 87. The lower shield layer 83 is formed on slider substrate 81.

Figure 3:
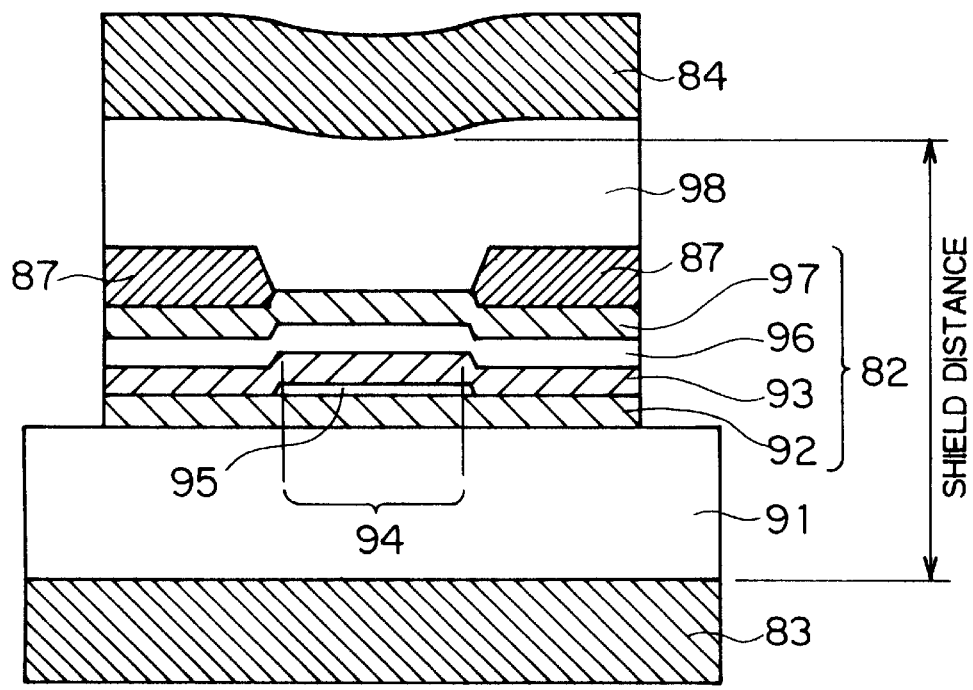
FIG. 3 is a schematic view which shows the sectional structure of a magnetoresistive sensor of the magnetic recording head in the magnetic recording system of Example 1.

FIG. 3 shows a sectional structure of the magnetoresistive sensor 82.

The magnetoresistive sensor 82 is provided on the lower shield layer 83 with a gap layer 91 intervening between them, and the magnetoresistive sensor 82 includes antiferromagnetic domain stabilizing layer 92 provided on the gap layer 91, thin film magnetoresistive conductive layer 93 of a ferromagnetic material which is made in a single domain by the antiferromagnetic domain stabilizing layer 92, non-magnetic layer 95 for cutting off the exchange interaction between sensor 94 of the thin film magnetoresistive conductive layer 93 and the antiferromagnetic domain stabilizing layer 92, soft magnetic layer 97 for generating a bias magnetic field for the sensor 94, and high resistivity layer 96 for controlling the current distribution ratio between the soft magnetic layer 97 and the thin film magnetoresistive conductive layer 93.

The magnetic recording head 73 was made in the following manner.

A sintered body mainly composed of aluminum oxide and titanium carbide was used as slider substrate 81. An Ni—Fe alloy film 1 $\mu$m thick was formed as lower shield layer 83 by a sputtering method.

An aluminum oxide film 100 nm thick was formed as the gap layer 91 by a sputtering method. An NiO layer 20 nm thick was formed as the antiferromagnetic domain stabilizing layer 92 by a sputtering method. An Nb layer 2 nm thick was formed as the non-magnetic layer 95 by a sputtering method. An Ni—Fe alloy layer 15 nm thick was formed as the thin film magnetoresistive conductive layer 93 by a sputtering method. A Ta layer 15 nm thick was formed as the high resistivity layer 96 by a sputtering method. An Ni—Fe—Nb alloy layer 20 nm thick was formed as the soft magnetic layer 97 by a sputtering method.

A Cu thin film 100 nm thick was formed as the electrode pattern 87 by a sputtering method.

Gap layer 98 comprising aluminum oxide of 100 nm thickness was formed between the electrode pattern 87 and the shield layer-recording magnetic pole 84 by a sputtering method.

An Ni—Fe alloy layer 1 $\mu$m thick was formed as the soft shield layer-recording magnetic pole 84 by a sputtering method.

A Cu film 3 $\mu$m thick was formed as coil 85 by a sputtering method.

An Ni—Fe alloy layer 3 $\mu$m thick was formed as the upper recording magnetic pole 86 by a sputtering method.

A gap layer comprising aluminum oxide 300 nm thick was also formed between the shield layer-recording magnetic pole 84 and the upper recording magnetic pole 86 by a sputtering method.

Figure 4:
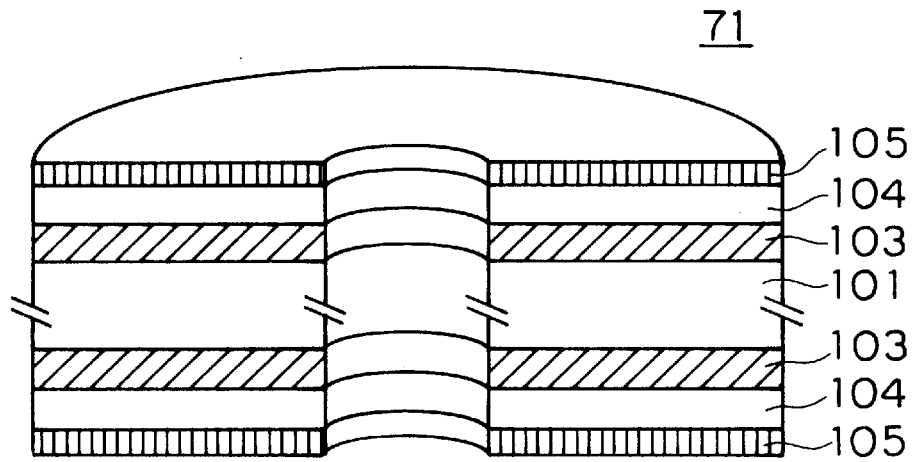
FIG. 4 is an oblique view which shows the structure of the magnetic recording medium in the magnetic recording system of Example 1.

FIG. 4 shows a sectional structure of the magnetic recording medium 71.

The magnetic recording medium 71 comprises substrate 101 of a chemically reinforced glass, magnetic layer 103 of Co—Pt magnetic material containing silicon oxide, protective carbon layer 104, and adsorptive perfluoroalkyl polyether lubricant layer 105.

The magnetic recording medium 71 was made in the following manner.

Magnetic layer 103 having a thickness of 25 nm and made of a Co—Pt magnetic material containing silicon oxide was formed on a disk-like glass substrate 101 of 2.5 inches in diameter and 0.4 mm thick by RF magnetron sputtering method under the deposition conditions of substrate temperature: room temperature, Ar gas pressure: 15 mTorr and power density: 5 W per 1 cm$^2$. Then, protective carbon layer 104 10–30 nm thick was formed on the magnetic layer 103 by DC magnetron sputtering method under the deposition conditions of substrate temperature: 150° C., Ar gas pressure: 5 mTorr and power density: 3 W per 1 cm$^2$. Thereafter, polystyrene particles were electrostatically coated on the surface of the protective layer 104, followed by subjecting it to plasma etching of 15 nm using the polystyrene particle coat as a mask to form micro unevenness on the surface of the protective layer 104. Finally, an adsorptive perfluoroalkyl polyether lubricant layer 105 2–20 nm thick was formed on the protective layer 104 by a dipping method.

Figure 5:
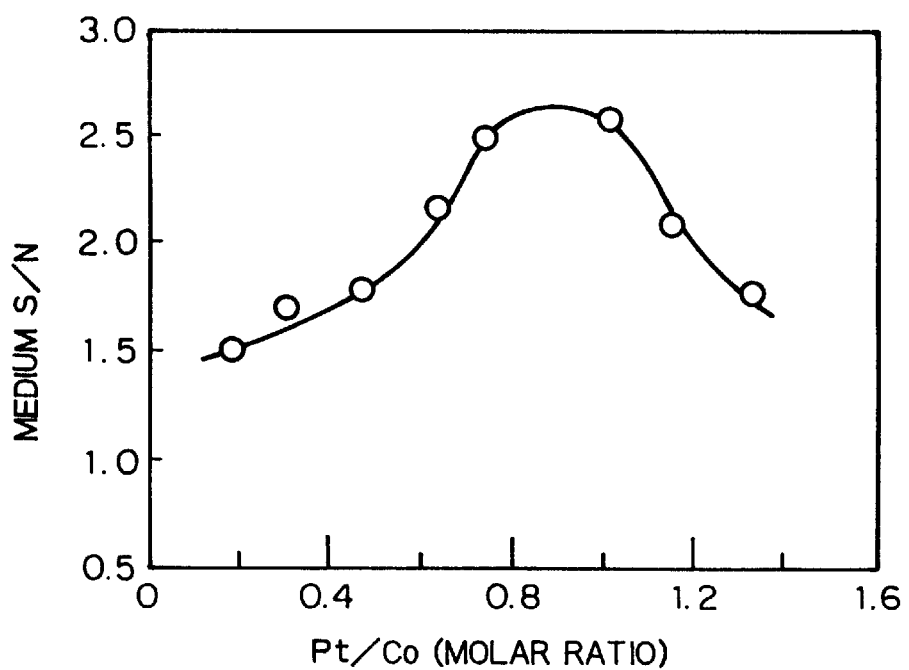
FIG. 5 is a characteristic curve which shows the relation between the molar ratio of Pt to Co in the magnetic layer of the magnetic recording medium and the medium S/N of the magnetic recording medium of Example 1.

FIG. 5 shows the relation between the molar ratio of Pt to Co in the Co—Pt magnetic material and the medium S/N at a recording density of 1 gigabit per 1 square inch. The molar ratio of silicon oxide to Co was 0.8.

When the molar ratio of Pt to Co was 0.6–1.2, the medium S/N could be 2.0 or more.

Figure 6:
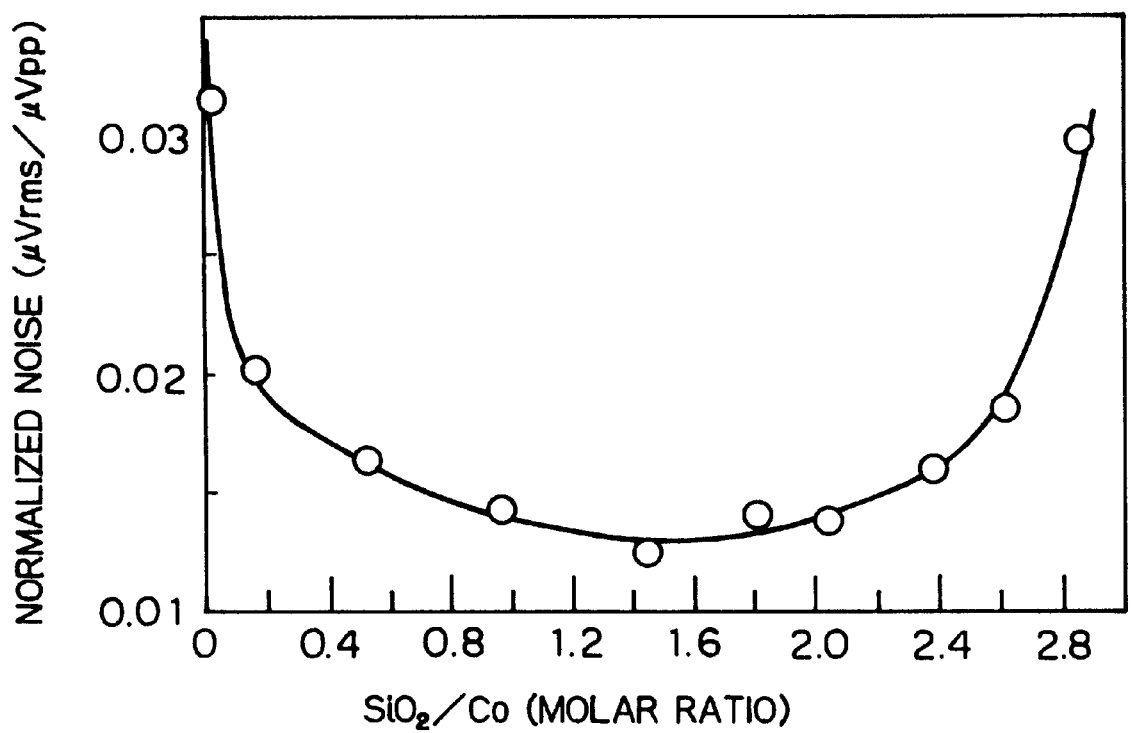
FIG. 6 is a characteristic curve which shows the relation between the molar ratio of silicon oxide to Co in the magnetic layer of the magnetic recording medium and the normalized noise of the magnetic recording medium of Example 1.

FIG. 6 shows the relation between the molar ratio of silicon oxide to Co in the Co—Pt magnetic material and the normalized noise. The molar ratio of Pt to Co was about 0.67 (60 at % Co-40 at % Pt).

When the molar ratio of silicon oxide to Co was 0.1–2.8, the normalized noise could be 0.025 or less. Especially, when the molar ratio of silicon oxide to Co was 0.5–2.4, the normalized noise could be 0.016 or less.

Figure 7:
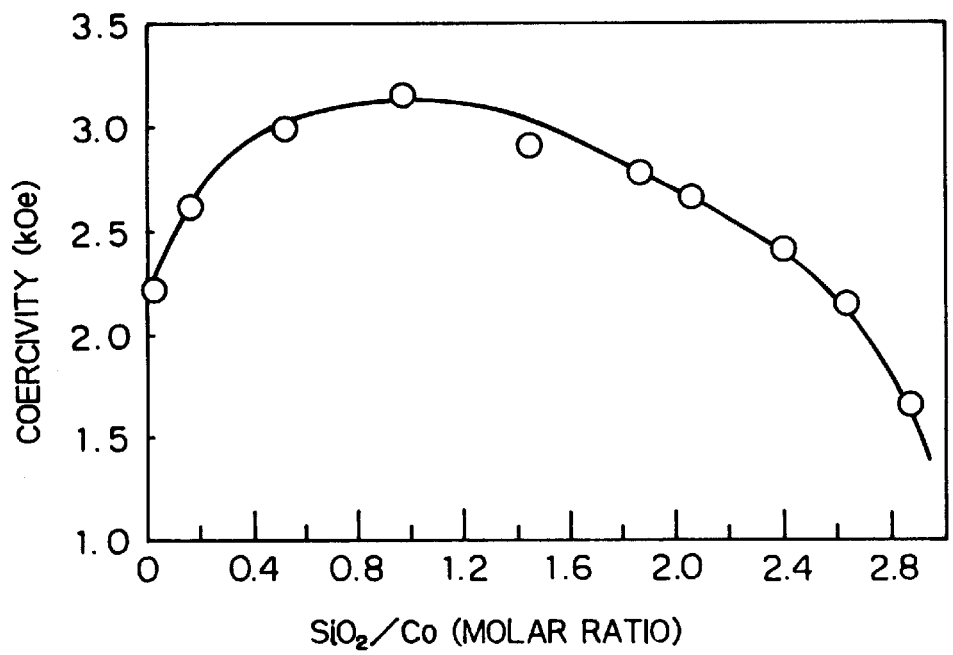
FIG. 7 is a characteristic curve which shows the relation between the molar ratio of silicon oxide to Co in the magnetic layer of the magnetic recording medium and the coercivity of the magnetic recording medium of Example 1.

FIG. 7 shows the relation between the molar ratio of silicon oxide to Co in the Co—Pt magnetic material and the coercivity. The molar ratio of Pt to Co was about 0.67.

When the molar ratio of silicon oxide to Co was 0.1 or more, the coercivity could be made to 2.4 kOe or more. Especially, when the molar ratio of silicon oxide to Co was 0.5–1.4, a coercivity of 3.0 kOe or more could be obtained and this is preferred.

Figure 8:
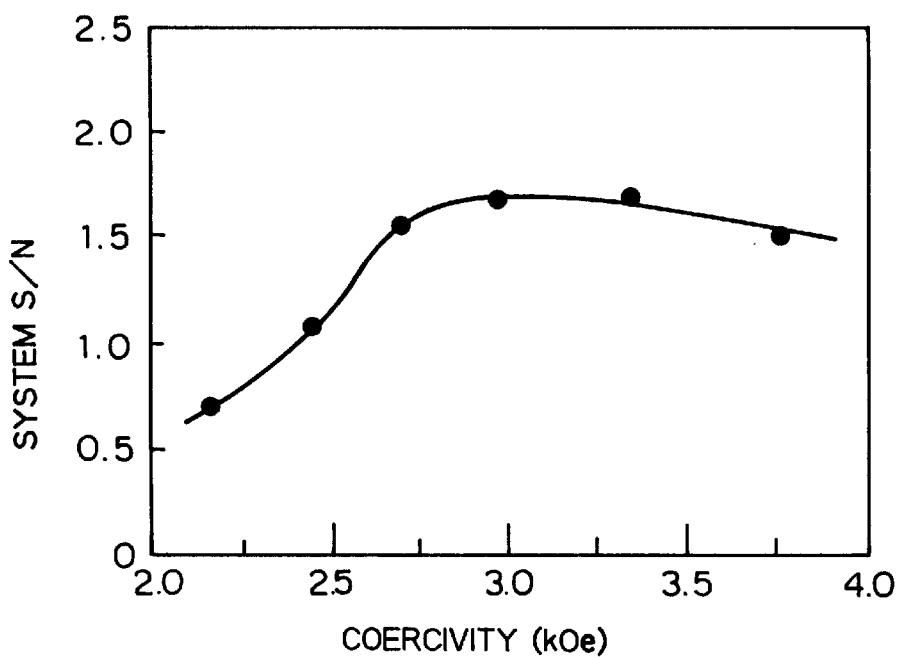
FIG. 8 is a characteristic curve which shows the relation between the coercivity and the system S/N.

As shown in FIG. 8, when the coercivity was less than 2.4 kOe, the system S/N was lower than 1 and the noise was greater than the signal. Thus, it is necessary that the coercivity be 2.4 kOe or more.

FIG. 8 is a graph prepared by plotting against each coercivity the maximum system S/N obtained by examining the system S/N using media different in Br•t.

On the other hand, when the molar ratio of silicon oxide to Co was higher than 2.8, sufficient output was not obtained.

Therefore, the molar ratio of silicon oxide to Co is preferably 0.1–2.8.

Figure 9:
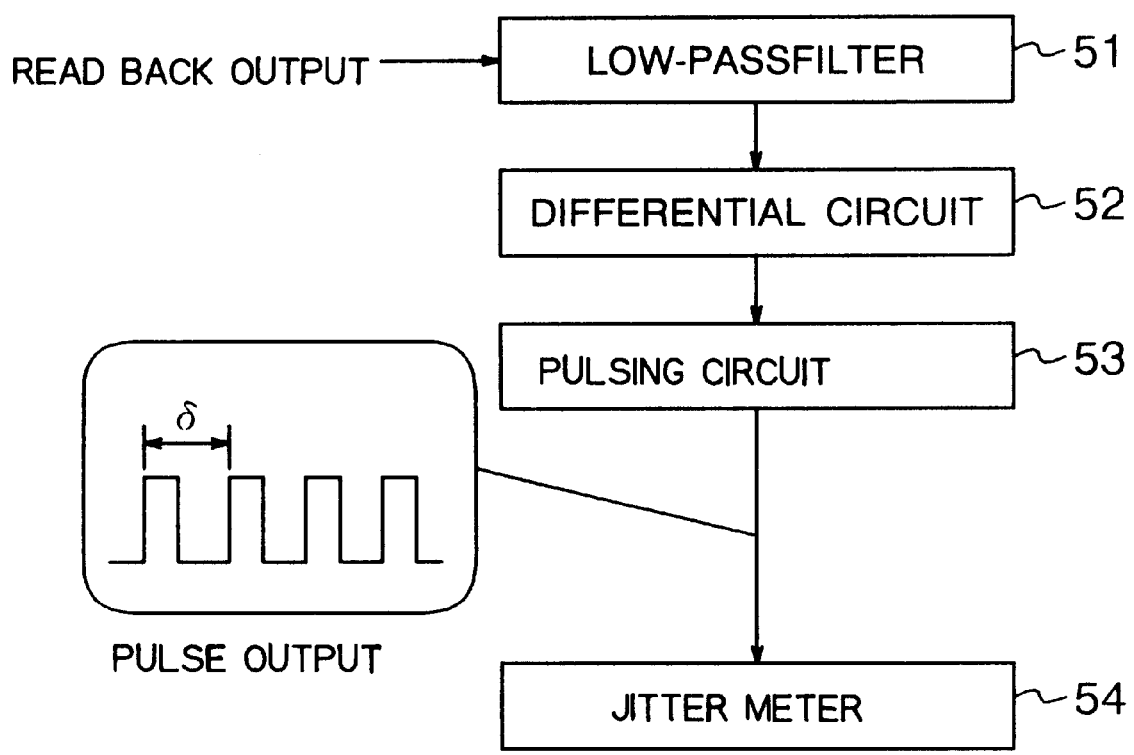
FIG. 9 is a block diagram of an apparatus for measuring jitter.

As shown in FIG. 9, the read output from magnetic recording head 73 was pulsed by low-pass filter 51, differential circuit 52 and pulsing circuit 53, the fluctuation of pulse interval, δ, was analyzed by jitter meter 54, and the ratio of standard deviation, σ, of pulse interval, δ, to the average value of the pulse interval, δ, was measured as jitter.

Figure 10:
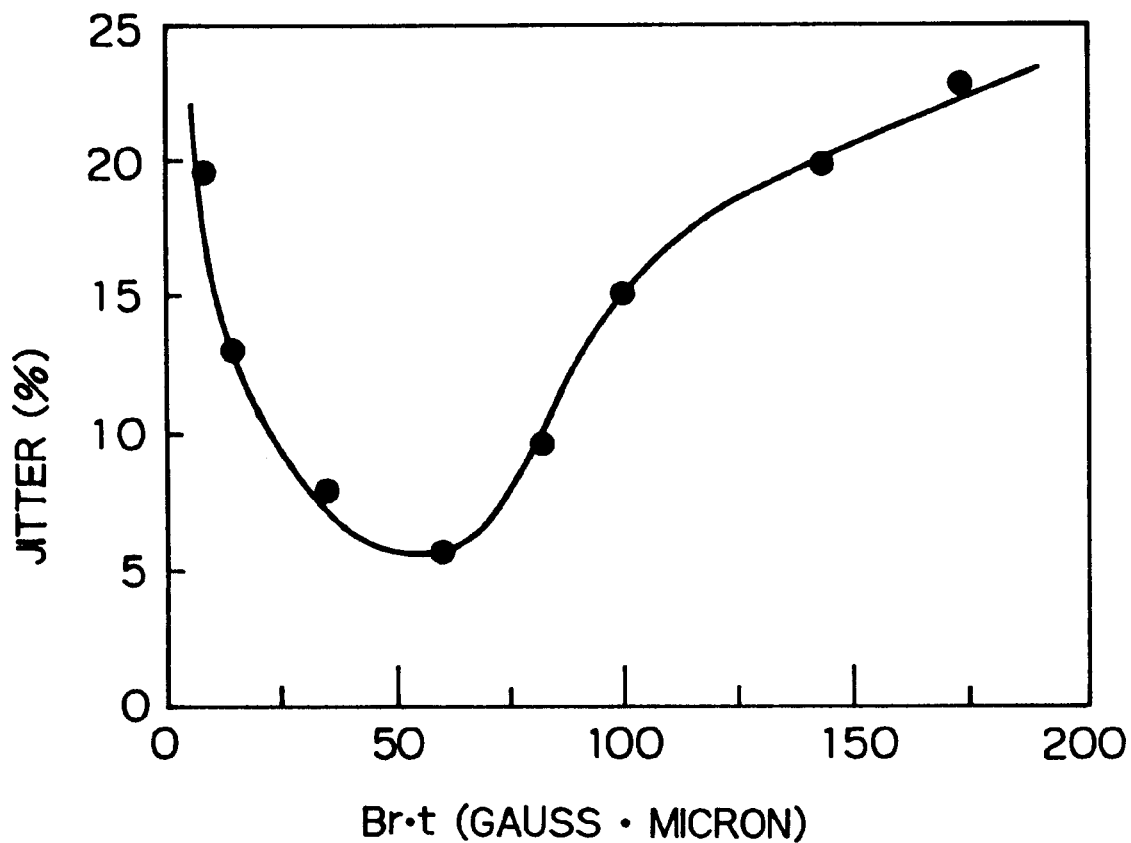
FIG. 10 is a characteristic curve which shows the relation between (Br•t) and jitter.

FIG. 10 shows the relation between the product (Br•t) of residual magnetic flux density, Br, measured by applying a magnetic field in the relative running direction of magnetic recording head 73 in respect to magnetic recording medium 71 at the time of recording and magnetic layer thickness, t, of the magnetic recording medium 71 and the jitter of the output signal when the high density signals of a constant frequency were written and read back.

When Br•t was in the range of 10–100 gauss•micron, jitter was less than about 15%, and discrimination of bits could be satisfactorily made.

Figure 11:
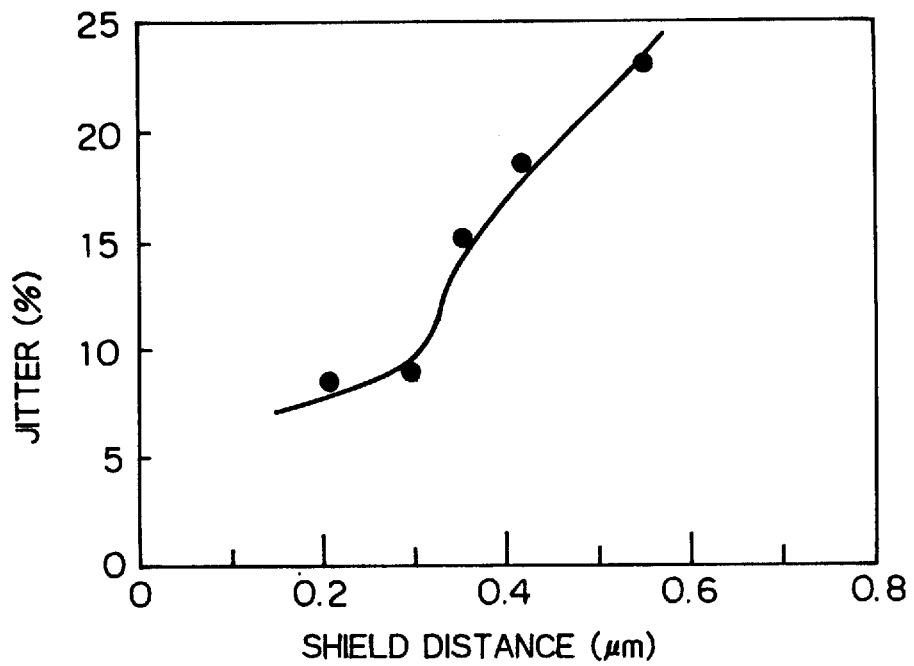
FIG. 11 is a characteristic curve which shows the relation between shield distance and jitter.

FIG. 11 shows the relation between the distance (shield distance) between the lower shield layer 83 and the shield layer-recording magnetic pole 84 and the jitter.

When the shield distance was less than 0.35 μm, jitter was less than about 15% and the bits could be satisfactorily discriminated.

The write/read characteristics of magnetic recording system 70 having magnetic recording medium 71 in which the molar ratio of Pt to Co in magnetic layer 103 was 0.67 (60 at % Co-40 at % Pt) and the molar ratio of silicon oxide to Co was about 0.9 were evaluated under the conditions of head flying height: 30 nm, linear recording density: 210 kBPI, and track density: 9.6 kTPI.

As a result, the system S/N was 1.8. This value was higher by about 30% than that obtained when 73 at % Co-15 at % Cr-12 at % Pt was used in place of 60 at % Co-40 at % Pt as the magnetic material.

Moreover, information of 2 gigabits per 1 square inch could be written and read by subjecting the input signal into the magnetic recording head 73 to 8–9 code modulation processing and subjecting the output signal to maximum likelihood decoding processing.

The number of bit errors after conducting a head seek test of 50,000 times from the inner periphery to the outer periphery was less than 10 bits/face and a mean time between failures MTBF of 150,000 hours could be attained.

A permanent magnet film bias layer may be used in place of the soft magnetic layer 97 of the magnetoresistive sensor 82.

Ti, Si, Si—C, carbon, crystallized glass, ceramics, etc. may be used as the material of substrate 101 of the magnetic recording medium 71.

As the material of protective layer 104 of the magnetic recording medium 71, there may be used carbides such as tungsten carbide and (W—Mo)—C, nitrides such as (Zr—Nb)—N and silicon nitride, oxides such as silicon dioxide and zirconia, and, furthermore, boron, boron carbide, molybdenum disulfide, Rh, etc. It is preferred to provide the protective layer 104 and the lubricant layer 105 because sliding resistance and corrosion resistance can be improved.

Furthermore, when micro unevenness is formed on the surface of the protective layer 104 by plasma etching using a fine mask or the like, or heterogeneous projections are produced on the surface of the protective layer using a target of a compound or mixture, or unevenness is formed on the surface by heat treatment, contact the area between the magnetic recording head 73 and the magnetic recording medium 71 can be reduced and the problem of the magnetic recording head 73 adhering to the surface of the magnetic recording medium 71 at the time of CSS (contact start stop) operation can be avoided.

EXAMPLE 2

Figure 12:
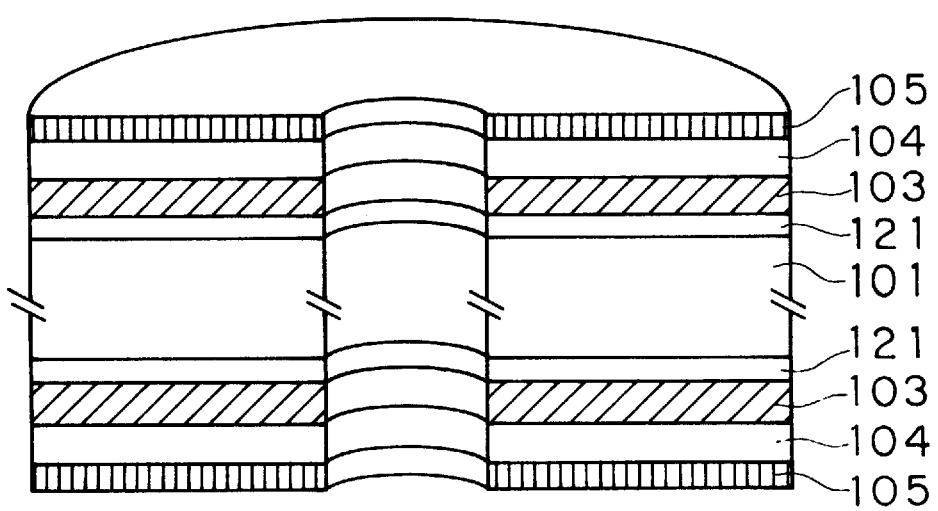
FIG. 12 is an oblique view which shows the structure of the magnetic recording medium in the magnetic recording system of Example 2.

Magnetic recording medium 71a having the structure shown in FIG. 12 was used in the magnetic recording system having the same construction as of Example 1.

This magnetic recording medium 71a had the same structure as that of the magnetic recording medium 71 of Example 1, except that underlayer 121 was additionally provided and the material of the magnetic layer 103 was changed.

The underlayer 121 was formed in the following manner.

Underlayer 121 of Cr having a thickness of 15 nm was formed on a disk-like glass substrate 101 of 2.5 inches in diameter and 0.4 mm in thickness by DC magnetron sputtering method under the deposition conditions of substrate temperature: room temperature, Ar gas pressure: 5 mTorr and power density: 7 W per 1 cm$^2$.

Ti, V, Ge, Zr, Nb, Mo, Ta, W, and Ni—P may be used as the material of underlayer 121.

The material of magnetic layer 103 was 52 at % Co-48 at % Pt to which silicon oxide, aluminum oxide, tantalum oxide, yttrium oxide or titanium oxide was added.

Table 1 shows composition of the magnetic recording medium 71a, magnetic properties and normalized noise. As a comparative example, results obtained when 73 at % Co-15 at % Cr-12 at % Pt was used in place of 52 at % Co-48 at % Pt are also shown in Table 1.

In all of the magnetic recording media 71a of Example 2, high coercivity and low normalized noise were obtained.

On the other hand, the coercivity was low and the normalized noise was high in the comparative example where 73 at % Co-15 at % Cr-12 at % Pt was used.

The write/read characteristics of a magnetic recording system having magnetic recording medium 71a of Sample No. 14 shown in Table 1 were evaluated under the conditions of head flying height: 26 nm, linear recording density: 210 kBPI, and track density: 9.6 kTPI.

As a result, the system S/N was 1.8.

Moreover, information of 2 gigabits per 1 square inch could be written and read by subjecting the input signals into the magnetic recording head 73 to 8–9 code modulation processing and subjecting the output signals to maximum likelihood decoding processing.

The number of bit errors after conducting a head seek test of 50,000 times from the inner periphery to the outer periphery was less than 10 bits/face and a mean time between failures MTBF of 150,000 hours could be attained.

In the conventional magnetic recording medium, the underlayer is provided for controlling orientation of the magnetic layer while in the magnetic recording medium of the present invention, it is provided for controlling crystal grain size and improvement of adhesion to the substrate and corrosion resistance.

TABLE 1

| Sample No. | Magnetic material | Oxide | Pt/Co Molar ratio | MOx/Co Molar ratio | Hc (kOe) | Br·t (G·μm) | Normalized noise (μVrms/μVpp) |
|---|---|---|---|---|---|---|---|
| 11 | Co-48 at % Pt | Silicon oxide | 0.92 | 1.05 | 3.08 | 87 | 0.013 |
| 12 | Co-48 at % Pt | Aluminum oxide | 0.92 | 1.01 | 2.83 | 91 | 0.015 |
| 13 | Co-48 at % Pt | Tantalum oxide | 0.92 | 1.07 | 2.72 | 84 | 0.016 |
| 14 | Co-48 at % Pt | Yttrium oxide | 0.92 | 1.01 | 2.68 | 83 | 0.017 |
| 15 | Co-48 at % Pt | Titanium oxide | 0.92 | 1.03 | 2.92 | 89 | 0.014 |
| Comparative Sample | Co-15 at % Cr -12 at % Pt | Silicon oxide | 0.16 | 1.05 | 2.05 | 88 | 0.021 |

EXAMPLE 3

Silicon nitride, boron nitride or aluminum nitride was added in place of the oxide as the non-magnetic compound to the magnetic layer of the magnetic recording medium 71a in Example 2.

Table 2 shows the composition of the magnetic recording medium, magnetic properties and normalized noise. As a comparative example, results obtained when 73 at % Co-15 at % Cr-12 at % Pt was used in place of 52 at % Co-48 at % Pt are also shown in Table 2.

In all of the magnetic recording media of Example 3, high coercivity and low normalized noise were obtained.

On the other hand, the coercivity was low and the normalized noise was high in the comparative example where 73 at % Co-15 at % Cr-12 at % Pt was used.

The write/read characteristics of the magnetic recording system having the magnetic recording medium of Sample No. 21 shown in Table 2 were evaluated under the conditions of head flying height: 26 nm, linear recording density: 210 kBPI, and track density: 9.6 kTPI.

As a result, the system S/N was 1.8.

Moreover, information of 2 gigabits per 1 square inch could be written and read by subjecting the input signal into the magnetic recording head 73 to 8–9 code modulation processing and subjecting the output signal to maximum likelihood decoding processing.

The number of bit errors after conducting a head seek test of 50,000 times from the inner periphery to the outer periphery was less than 10 bits/face and a mean time between failures MTBF of 150,000 hours could be attained.

EXAMPLE 4

Figure 13:
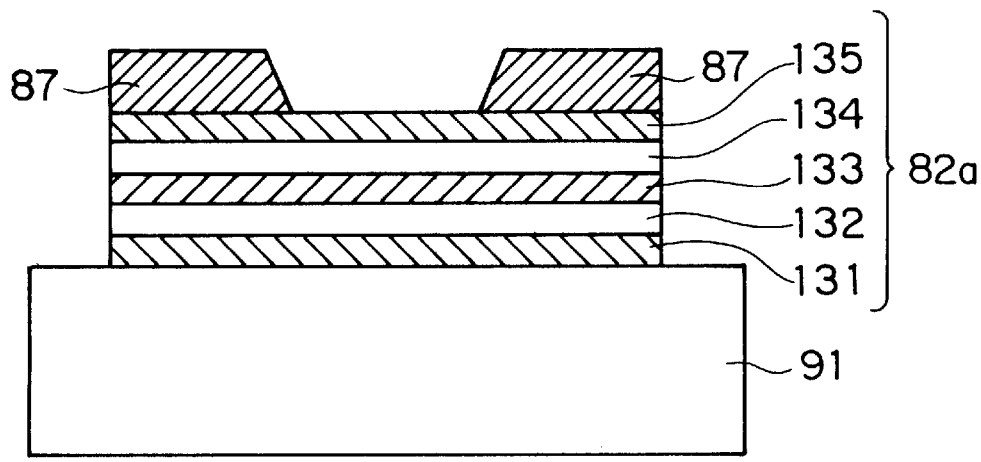
FIG. 13 is a schematic view which shows the sectional structure of a magnetoresistive sensor of the magnetic recording head in the magnetic recording system of Example 4.

In the magnetic recording system having the same construction as of Example 1, magnetoresistive sensor 82a shown in FIG. 13 was used in place of the magnetoresistive sensor 82 (FIG. 3) of the magnetic recording head for reading. Moreover, an Fe—Co—Ni alloy film formed by plating method was used as the upper recording magnetic pole 86 of the magnetic recording head for writing. In addition, the magnetic recording medium was changed.

The magnetoresistive sensor 82a shown in FIG. 13 was a magnetoresistive sensor which utilizes resistivity change occurring due to the change in the relative magnetization directions between the two magnetic layers 132 and 134 which are separated by a non-magnetic layer 133 (magnetoresistivity change due to the spin valve effect).

Buffer layer 131 was a Ti layer 2 nm thick. The first magnetic layer 132 was a 80 at % Ni-20 20 at % Fe alloy layer 3 nm thick. The non-magnetic layer 133 was a Cu layer of 1.5 nm thick. The second magnetic layer 134 was a 80 at % Ni-20 at % Fe alloy layer 3 nm thick. Antiferromagnetic layer 135 was a 50 at % Fe-50 at % Mn alloy layer of 5 nm thick.

These layers were all formed by a sputtering method.

In this magnetoresistive sensor 82a, the magnetization of the second magnetic layer 134 is fixed in one direction by the exchange bias magnetic field from the antiferromagnetic layer 135 and the magnetization direction of the first magnetic layer 132 changed by the leakage field from the magnetic recording medium 71 to cause a change in resistivity.

By using Ti as the buffer layer 131, the crystal lattice plane {111} of the first magnetic layer 132 and the second magnetic layer 134 was orientated so that the plane was in

TABLE 2

| Sample No. | Magnetic material | Nitride | Pt/Co Molar ratio | LNy/Co Molar ratio | Hc (kOe) | Br·t (G·μm) | Normalized noise (μVrms/μVpp) |
|---|---|---|---|---|---|---|---|
| 21 | Co-48 at % Pt | Silicon nitride | 0.92 | 1.03 | 2.91 | 86 | 0.014 |
| 22 | Co-48 at % Pt | Boron nitride | 0.92 | 1.01 | 2.86 | 89 | 0.015 |
| 23 | Co-48 at % Pt | Aluminum nitride | 0.92 | 1.05 | 2.72 | 91 | 0.017 |
| Comparative Sample | Co-15 at % Cr -12 at % Pt | Silicon nitride | 0.16 | 1.01 | 1.86 | 87 | 0.024 | parallel to the film surface. Thus, the exchange interaction between the magnetic layers 132 and 134 was weakened and a sensitivity which was about twice that of the magnetoresistive sensor 82 of Example 1 was obtained.

Furthermore, by using an Fe—Co—Ni alloy film formed by a plating method as the upper recording magnetic pole 86, the saturated magnetic flux density increased to 16000 gauss and the over writing characteristics could be improved by about 6 dB as compared with those of Example 3.

The magnetic recording medium had the structure obtained by forming the magnetic layer 103 of 25 nm composed of 52 at % Co-48 at % Pt containing silicon oxide at a molar ratio of 1.2 (molar ratio of the silicon oxide to Co) on a carbon substrate having a diameter of 1.3 inch, a thickness of 0.4 mm and a surface roughness of 1 nm under the same conditions as in Example 1, forming thereon protective carbon layer 104 20 nm thick, subjecting the surface to electrostatic coating with polystyrene particles, carrying out plasma etching of 13 nm using the coat as a mask to form micro unevenness on the surface of the protective layer 104, and, finally, forming an adsorptive perfluoroalkyl polyether lubricant layer 105 on the protective layer 104 by a dipping method.

The coercivity measured by applying a magnetic field in the circumferential direction of the disk of this magnetic recording medium was 2.71 kOe and the product of residual magnetic flux density, Br, and the total magnetic layer thickness, t, (Br•t) was 62 gauss•micron.

The write/read characteristics of the magnetic recording system of Example 4 were evaluated under the conditions of head flying height: 25 nm, linear recording density: 260 kBPI, and track density: 11.6 kTPI.

As a result, the system S/N was 1.5.

Information of 3 gigabits per 1 square inch could be written and read back by subjecting the input signal into the magnetic recording head 73 to 8–9 code modulation processing and subjecting the output signal to maximum likelihood decode processing.

The number of bit errors after conducting a head seek test of 50,000 times from the inner periphery to the outer periphery was less than 10 bits/face and a mean time between failures (MTBF) of 150,000 hours could be attained.

The thickness of the non-magnetic layer 133 in the magnetoresistive sensor 82a is preferably 1.5 nm or more, but if it is too thick, the over writing characteristics are deteriorated since the distance between the magnetic recording head for writing and the lowermost magnetic layer 132 is great. Especially, when the non-magnetic layer has a two-layer structure, the over writing characteristics are deteriorated because the non-magnetic layer becomes too thick. In order to solve this problem, it is effective to use as the recording magnetic pole of the magnetic recording head for writing a soft magnetic thin film of an Fe—Co—Ni alloy, an Fe—Si alloy or the like which has a higher saturated magnetic flux density than the conventional Ni—Fe alloys. Especially, good results can be obtained when a soft magnetic thin film having a saturated magnetic flux density of at least 15000 gauss is used.

EXAMPLE 5

Figure 14:
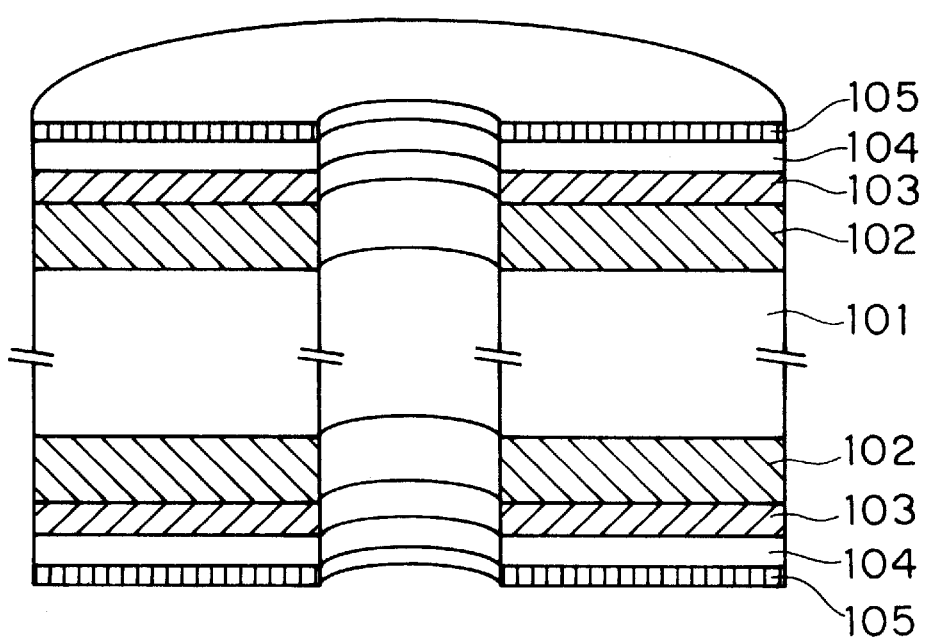
FIG. 14 is an oblique view which shows the structure of the magnetic recording medium in the magnetic recording system of Example 5.

As shown by magnetic recording medium 71b in FIG. 14, the medium may have a structure comprising a substrate 101 of Al—Mg alloy and, formed on both sides thereof, non-magnetic plated layer 102 of Ni—P, Ni—W13 P or the like, magnetic layer 103, protective layer 104 and lubricant layer 105.

EXAMPLE 6

Figure 15:
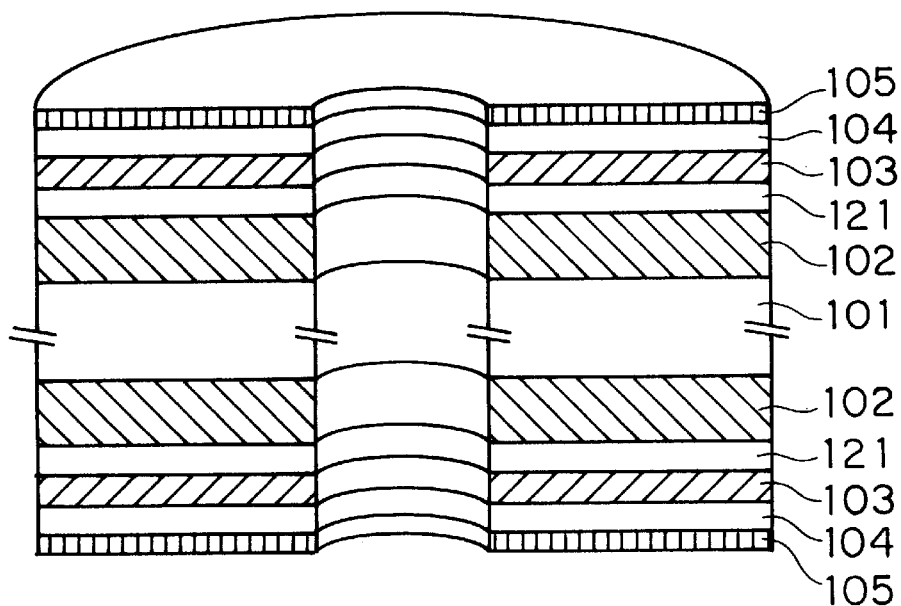
FIG. 15 is an oblique view which shows the structure of the magnetic recording medium in the magnetic recording system of Example 6.

As shown by magnetic recording medium 71c in FIG. 15, the medium may have a structure comprising a substrate 101 of Al—Mg alloy and, formed on both sides thereof, non-magnetic plated layer 102 of Ni—P, Ni—W—P or the like, underlayer 121, magnetic layer 103, protective layer 104 and lubricant layer 105.

COMPARATIVE EXAMPLE 1

Relations between the molar ratio of silicon oxide to Co and the normalized noise and between the molar ratio of silicon oxide to Co and the coercivity (Hc) when 73 at % Co-15 at % Cr-12 at % Pt was used as the magnetic material of the magnetic layer 103 of the magnetic recording medium 71 of Example 1 were examined.

Figure 16:
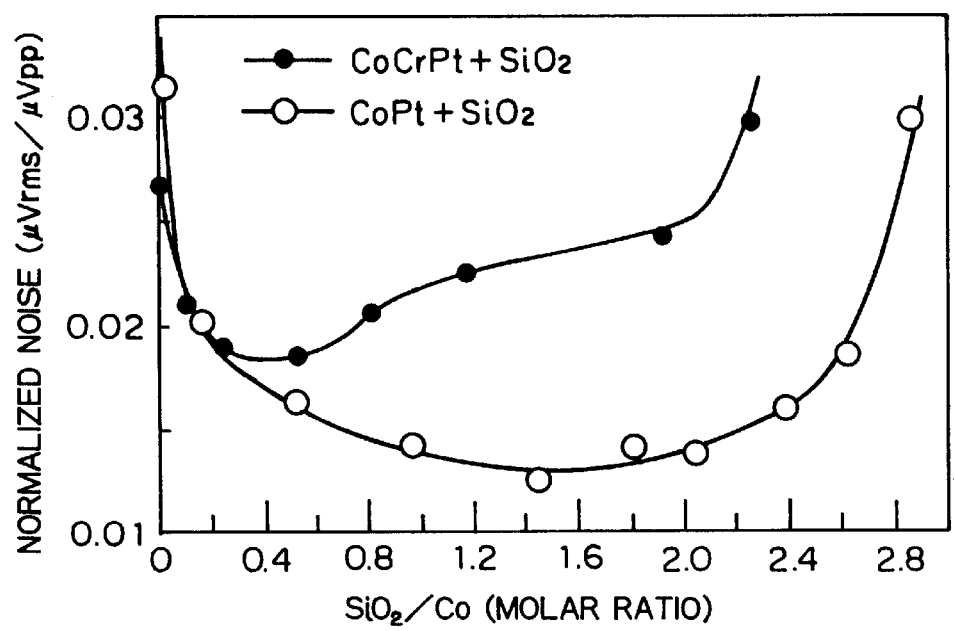
FIG. 16 is a characteristic curve which shows the relation between the molar ratio of silicon oxide to Co in the magnetic layer of the magnetic recording medium and the normalized noise of the magnetic recording medium of a Comparative Example.

As shown by a line joining filled data points in FIG. 16, when the molar ratio of silicon oxide to Co was more than 0.1, the normalized noise was greater than that of the magnetic recording medium 71 of Example 1 shown by a line joining unfilled data points.

Figure 17:
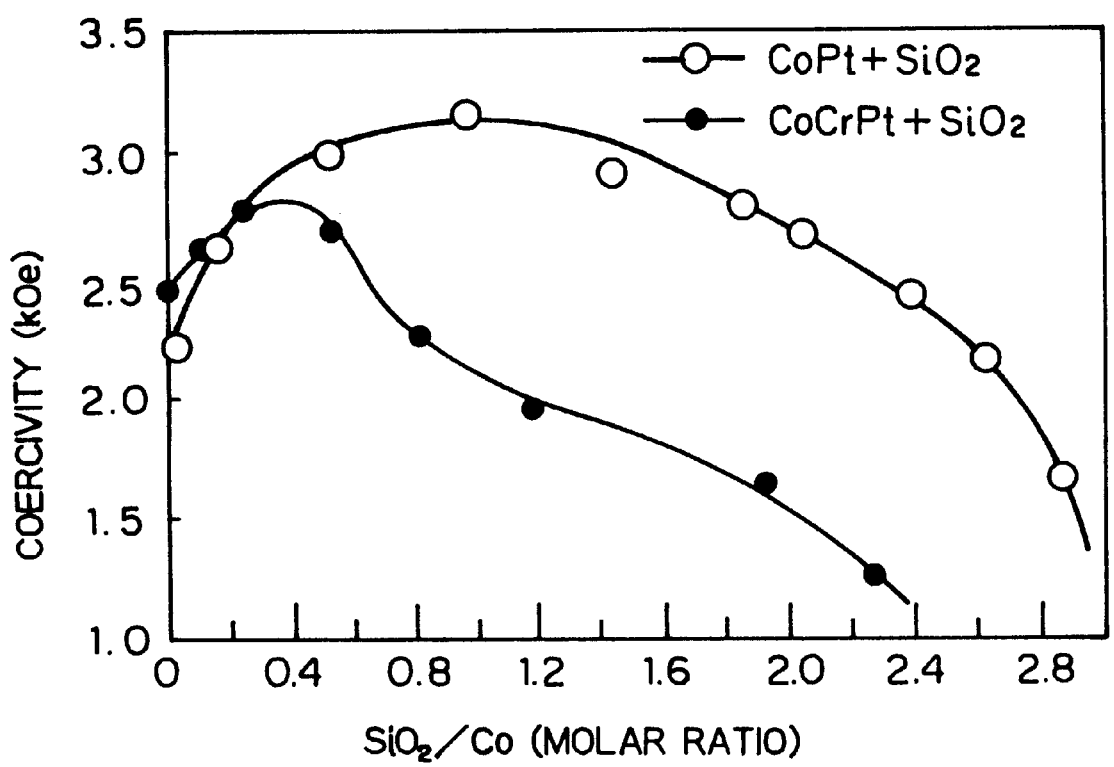
FIG. 17 is a characteristic curve which shows the relation between the molar ratio of silicon oxide to Co in the magnetic layer of the magnetic recording medium and the coercivity of the magnetic recording medium of the Comparative Example.

Furthermore, as shown by a line joining filled data points in FIG. 17, when the molar ratio of silicon oxide to Co was more than 0.2, the coercivity was lower than that of the magnetic recording medium 71 of Example 1 shown by a line joining unfilled data points.

COMPARATIVE EXAMPLE 2

In place of adding the oxide or nitride, a mixed gas comprising an Ar. sputtering gas used for film deposition by sputtering and oxygen or nitrogen was used.

The coercivity was increased to some extent. However, the effect of reducing the normalized noise was small and it was difficult to realize a recording density of higher than 1 gigabit per 1 square inch.

It is considered that this is because when an oxygen or nitrogen mixed gas is used, oxygen or nitrogen is taken into not only crystal grain boundary, but also crystal grains and this damages the crystallinity.

According to the magnetic recording system and the magnetic recording medium of the present invention, a high S/N and a low bit error rate can be obtained, and, therefore, a mean time between failures of more than 150,000 hours can be realized with a high recording density of at least 1 gigabit per 1 square inch.

What is claimed is:

1. A magnetic recording system having a magnetic recording medium and a magnetic recording head, said magnetic recording medium comprising a substrate and a magnetic layer formed on the substrate directly or indirectly with an underlayer intervening between the magnetic layer and the substrate and said magnetic recording head carrying out writing in and reading back from the magnetic recording medium, wherein the magnetic layer of the magnetic recording medium consists essentially of a mixture of at least one non-magnetic compound selected from the group consisting of oxides represented by the formula MOx (wherein N represents at least one element selected from the group consisting of Si, Al, Ta, Y and Ti, and x represents a numerical value of from about 1 to about 2.5) and a magnetic material of an alloy consisting essentially of Co and Pt, wherein the molar ratio of Pt to Co in the magnetic layer falls within the range of from 0.6 to 1.2, and wherein the molar ratio of the non-magnetic compound to Co falls within the range of from 0.1 to 2.8, and the magnetic recording head includes a magnetoresistive read back magnetic recording head.

2. The magnetic recording system according to claim 1, wherein the magnetoresistive read back magnetic recording head has two shield layers and a magnetoresistive sensor formed between the shield layers and the distance between the two shield layers is 0.35 μm or less.

3. The magnetic recording system according to claim 1, wherein the product (Br•t) of a residual magnetic flux density, Br, measured by applying a magnetic field in the relative running direction of the magnetic recording head in respect to the magnetic recording medium at the time of recording and a thickness, t, of the magnetic layer of the magnetic recording medium falls within the range of from 10 to 100 gauss•micron.

4. The magnetic recording system according to claim 1, wherein the coercivity of the magnetic recording medium measured by applying a magnetic field in the relative running direction of the magnetic recording head in respect to the magnetic recording medium at the time of recording is 2.4 kOe or more.

5. The magnetic recording system according to claim 1, wherein the magnetoresistive read back magnetic recording head has a magnetoresistive sensor including a plurality of magnetic layers and non-magnetic layers provided between the magnetic layers, said magnetic layers causing a great change in resistivity due to relative change of mutual magnetization directions by external magnetic field.

6. The magnetic recording system according to claim 1, wherein the molar ratio of the non-magnetic compound to Co in the magnetic layer of the magnetic recording medium falls within the range of from 0.5 to 2.4.

7. A magnetic recording system having a magnetic recording medium and a magnetic recording head, said magnetic recording medium comprising a substrate and a magnetic layer formed on the substrate directly or indirectly with an underlayer intervening between the magnetic layer and the substrate and said magnetic recording head carrying out writing in and reading back from the magnetic recording medium, wherein the magnetic layer of the magnetic recording medium consists essentially of a mixture of at least one non-magnetic compound selected from the group consisting of nitrides represented by the formula LNy (wherein L represents at least one element selected from the group consisting of Si, B and Al and y represents a numerical value of from about 1 to about 1.3) and a magnetic material of an alloy consisting essentially of Co and Pt, wherein the polar ratio of Pt to Co in the magnetic layer falls within the range of from 0.6 to 1.2, and wherein the solar ratio of the non-magnetic compound to Co falls within the range of from 0.1 to 2.8, and the magnetic recording head includes a magnetoresistive read back magnetic recording head.

8. The magnetic recording system according to claim 6, wherein the magnetoresistive read back magnetic recording head has two shield layers and a magnetoresistive sensor formed between the shield layers and the distance between the two shield layers is 0.35 μm or less.

9. The magnetic recording system according to claim 7, wherein the product (Br•t) of a residual magnetic flux density, Br, measured by applying a magnetic field in the relative running direction of the magnetic recording head in respect to the magnetic recording medium at the time of recording and a thickness, t, of the magnetic layer of the magnetic recording medium falls within the range of from 10 to 100 gauss•micron.

10. The magnetic recording system according to claim 7, wherein the coercivity of the magnetic recording medium measured by applying a magnetic field in the relative running direction of the magnetic recording head in respect to the magnetic recording medium at the time of recording is 2.4 kOe or more.

11. The magnetic recording system according to claim 7, wherein the magnetoresistive read back magnetic recording head has a magnetoresistive sensor including a plurality of magnetic layers and nonmagnetic layers provided between the magnetic layers, said magnetic layers causing a great change in resistivity due to relative change of mutual magnetization directions by external magnetic field.

12. The magnetic recording system according to claim 7, wherein the molar ratio of the non-magnetic compound to Co in the magnetic layer of the magnetic recording medium falls within the range of from 0.5 to 2.4.

13. A magnetic recording medium comprising a substrate and a magnetic layer formed on the substrate directly or indirectly with an underlayer intervening between the magnetic layer and the substrate, wherein the magnetic layer consists essentially of a mixture of at least one non-magnetic compound selected from the group consisting of oxides represented by the formula MOx (wherein M represents at least one element selected from the group consisting of Si, Al, Ta, Y and Ti, and x represents a numerical value of from about 1 to about 2.5) and a magnetic material of an alloy consisting essentially of Co and Pt, wherein the molar ratio of Pt to Co in the magnetic layer falls within the range of from 0.6 to 1.2, and wherein and the molar ratio of the non-magnetic compound to Co falls within the range of from 0.1 to 2.8.

14. The magnetic recording medium according to claim 13, wherein the molar ratio of the non-magnetic compound to Co in the magnetic layer falls within the range of from 0.5 to 2.4.

15. A magnetic recording medium comprising a substrate and a magnetic layer formed on the substrate directly or indirectly with an underlayer intervening between the substrate and the magnetic layer, wherein the magnetic layer consists essentially of a mixture of at least one non-magnetic compound selected from the group consisting of nitrides represented by the formula LNy (wherein L represents at least one element selected from the group consisting of Si, B and Al and y represents a numerical value of from about 1 to about 1.3) and a magnetic material of an alloy consisting essentially of Co and Pt, wherein the molar ratio of Pt to Co in the magnetic layer falls within the range of from 0.6 to 1.2, and wherein the molar ratio of the non-magnetic compound to Co falls within the range of from 0.1 to 2.8.

16. The magnetic recording medium according to claim 15, wherein the molar ratio of the non-magnetic compound to Co in the magnetic layer falls within the range of from 0.5 to 2.4.

* * * * *